United States Patent [19]

Ganis

[11] 4,271,596
[45] Jun. 9, 1981

[54] INSTRUMENT AND METHOD FOR DETERMINING MAP COORDINATES

[76] Inventor: G. Robert Ganis, Rte. #1, Box 267, Harrisburg, Pa. 17111

[21] Appl. No.: 91,796

[22] Filed: Nov. 6, 1979

[51] Int. Cl.³ .............................................. G01B 3/02
[52] U.S. Cl. ..................................... 33/1 C; 33/1 B; 33/494
[58] Field of Search ............. 33/1 B, 1 C, 1 R, 1.5 D, 33/192, 476, 494; 235/61 GM, 61 NV, 61 B; 35/40

[56] References Cited

U.S. PATENT DOCUMENTS

| | | | |
|---|---|---|---|
| 1,232,290 | 7/1917 | Grunberg | 33/1 B |
| 1,930,478 | 10/1933 | Jones | 35/40 |
| 2,353,799 | 7/1944 | Ward | 33/192 |
| 3,528,077 | 9/1970 | Seiden | 33/1 B |

Primary Examiner—William D. Martin, Jr.

[57] ABSTRACT

An instrument and method is provided for accurately determining the geographic coordinates of a specific location on a map. The instrument comprises a flat transparent plastic sheet having a variable length scale printed thereon which is defined by a plurality of straight lines radiating from a common point. Indicia are also printed on the sheet for designating the radiating lines as graduations of a scale comprising either 2.5 or 5 minutes, and with each minute being further broken down into sixty seconds. To determine a coordinate, the location in question on the map is projected to the border along a direction parallel to one set of the geographic coordinates. The transparent sheet is then placed over the map, and the scale is aligned with respect to the border such that the outermost of the radiating lines directly overlie the tick marks on the map between which the projected location falls. The scale is then read above the point at which the projected location intersects the border of the map. The procedure is repeated to determine the other coordinate.

3 Claims, 2 Drawing Figures

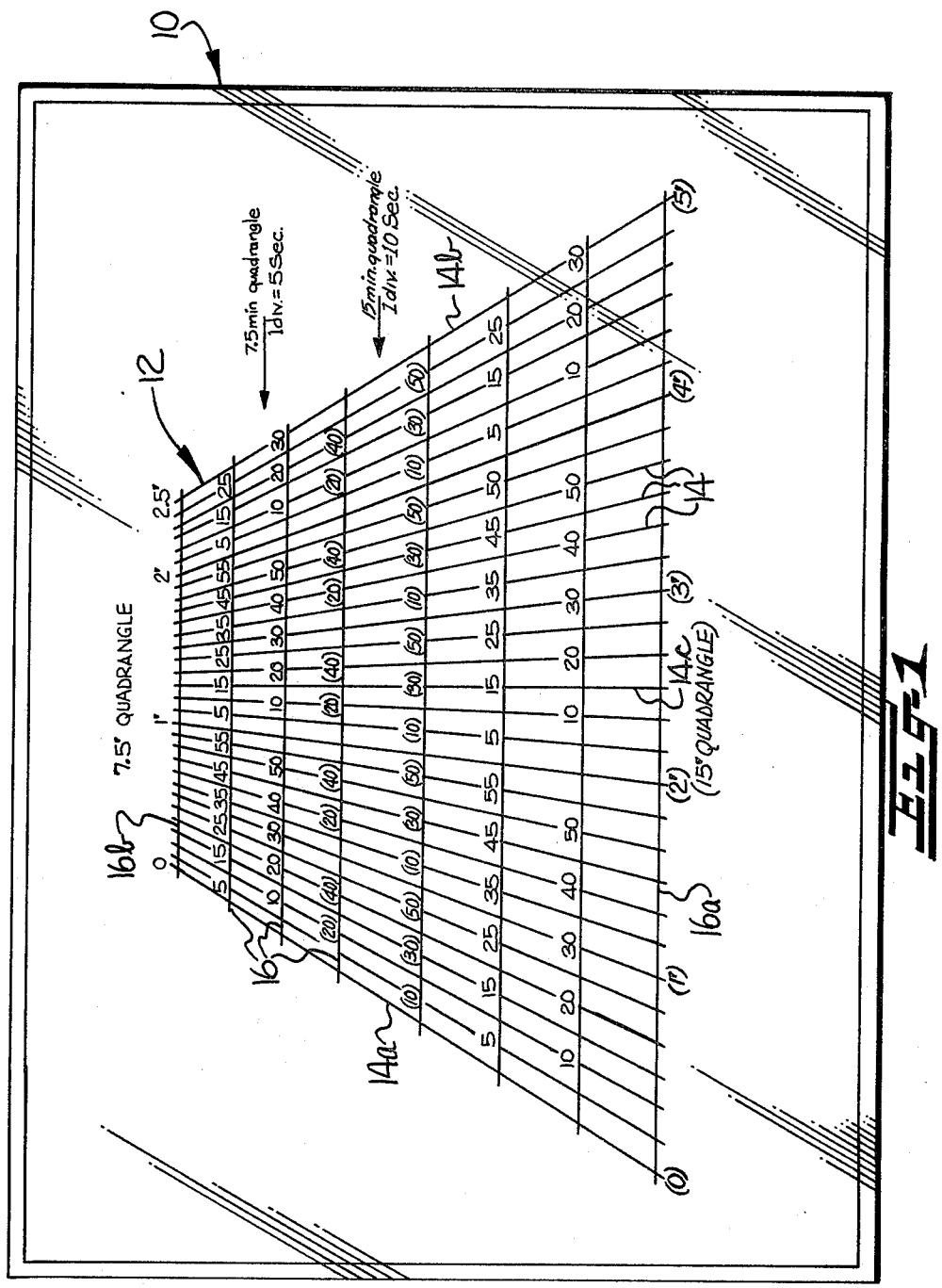

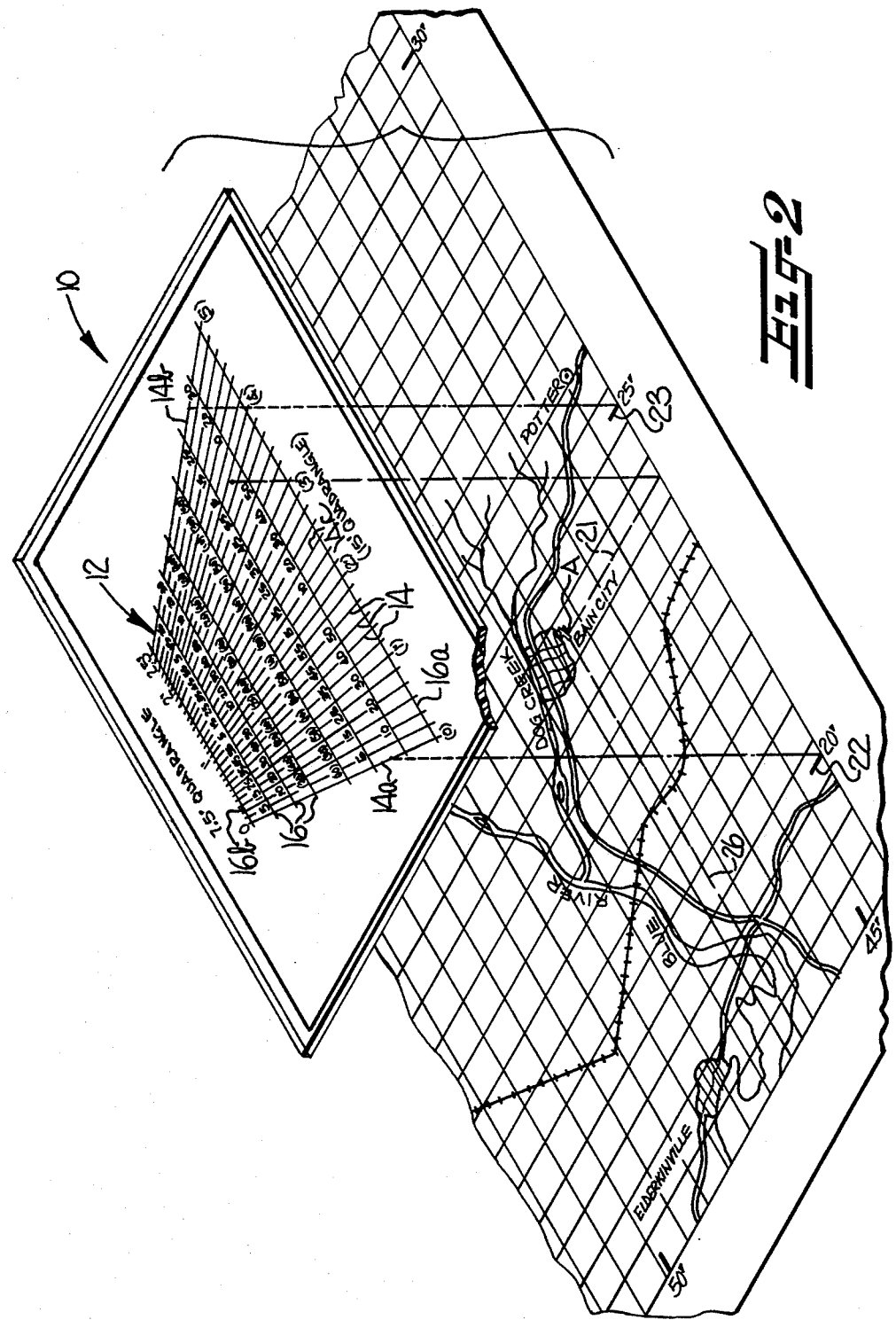

INSTRUMENT AND METHOD FOR DETERMINING MAP COORDINATES

The present invention relates to an instrument which is adapted to assist in accurately determining the geographic coordinates of a specific location on a map having the coordinates indicated by tick marks positioned at regular intervals along the borders thereof.

As is well known, geographic coordinates are utilized for locating a point on the earth's surface, and consist of two parts, namely latitude and longitude. The coordinates are expressed in terms of degrees, and for more specific identifications, the degrees are each broken down into sixty minutes, and the minutes are in turn each broken down into sixty seconds.

In conventional topographic or military maps, the borders or "neat lines" are lines of latitude and longitude, and the geographic coordinates of these lines appear at the corners of the mapped area. Also, small tick marks are regularly spaced along the borders and indicate the latitude or longitude at such points. In one conventional series of topographic maps published by the U.S. government, the edges of the mapped area extend 7.5 minutes, and the interval between the tick marks represents 2.5 minutes. In another conventional series, the edges extend 15 minutes and the interval between the tick marks is 5 minutes.

As is also well known, the distance between adjacent lines of latitude and longitude are not uniform and vary depending upon their particular location on the earth's surface. Such variation is particularly pronounced in the case of longitude, due to the convergence of the lines of longitude toward the poles. As a result, the distance between the tick marks along the borders of the map will vary. This in turn causes difficulty in attempting to accurately determine the coordinates of a specific location on a map which is between the tick marks, since a linear ruler or scale can necessarily only divide one specific distance into its components. Thus a single conventional ruler or scale is incapable of directly determining a location between more than one pair of tick marks.

One presently used procedure for determining the geographic coordinates of a point between the tick marks involves the use of a ruler having a length somewhat greater than the distance between the adjacent tick marks. In use, the tick marks on opposite edges of the map are connected with straight lines drawn on the map to form a trapezoid (of for example either 2.5 or 5 minute sides) which encloses the location in question. To determine the first coordinate, the ruler is positioned with its zero graduation along the extended tick mark line on one side of the location in question, and the maximum graduation is positioned along the opposite extended tick mark line, so that the ruler is laterally disposed with respect to the extended lines. The ruler is then slid left or right (or up and down) until the edge of the ruler overlies the location in question, and the coordinate is then calculated from the graduation on the ruler overlying the location in question. The same procedure is utilized to determine the other coordinate. As will be apparent, this procedure is not satisfactory, since it is time consuming, requires conversion of linear measure to degrees and is error prone.

It is accordingly an object of the present invention to provide an instrument and method for easily accurately and directly determining the geographic coordinates of a specific location on a map of the above described type.

This and other objects and advantages of the present invention are achieved in the embodiment illustrated herein by the provision of an instrument which comprises a sheet of transparent flat material. A plurality of straight lines are disposed on the sheet, with the lines radiating from a common point and being spaced at equal angular increments. Indicia means are also disposed on the sheet for designating the radiating lines as graduations of a scale comprising one or more minutes of sixty seconds each. Further, the instrument preferably includes a plurality of straight, parallel lines extending in a direction transverse to the radiating lines and perpendicular to a line extending medially between the outermost of the radiating lines. The transverse lines are laterally spaced apart from each other so as to encompass therebetween substantially the full length of the radiating lines.

In the preferred embodiment as illustrated herein, the scale defined by the indicia means is graduated to conform to the distance in coordinates between the tick marks in each of two of the standard series of maps. In particular, the indicia means defines one scale having a length of 2.5 minutes, as well as a second scale having a length of 5 minutes. Also, the scale is physically sized so that the outermost radiating lines are transversely spaced apart to encompass the range of distances which the tick marks are spaced on the two standard series of maps, and which cover areas of North America and other parts of the world.

In use, the location in question is projected to the borders along each of two lines which are parallel to the sets of coordinates. The sheet is then placed over the map and aligned with one border such that the outermost of the radiating lines directly overlie the tick marks between which the projected location falls, and with the border of the map extending perpendicularly to a line extending medially between such outermost radiating lines. The scale on the sheet is then read above the point at which the projected location intersects the border of the map. The indicia thus read represents the number of minutes and/or seconds by which the coordinate value indicated by an adjacent tick mark must be adjustable as described hereinafter. The sheet is then aligned with the other border and the procedure repeated to determine the other coordinate.

Some of the objects having been stated, other objects will appear as the description proceeds, when taken in connection with the accompanying drawings in which:

FIG. 1 is a top plan view of an instrument embodying the present invention; and

FIG. 2 is a perspective view of the instrument in association with a conventional map, and illustrating its method of use.

Referring more specifically to the drawings, an instrument embodying the features of the present invention is indicated generally at 10. The instrument comprises a rectangular sheet of transparent flat material formed of a suitable clear plastic or the like, and which is typically about letter size.

The sheet has a variable length scale 12 imprinted on the face thereof, with the scale being defined by a plurality of straight lines 14 radiating from a common point disposed remote from the sheet. The radiating lines are spaced apart equal angular increments, with the outermost lines 14a, 14b being disposed at an angle of about sixty degrees with respect to each other.

The scale 12 further comprises a plurality of straight, parallel lines 16 extending in a direction transverse to the radiating lines and perpendicular to a line extending medially between the outermost of said radiating lines. In the illustrated embodiment, such medial line conforms to the central radiating line 14c. The transverse lines 16 are laterally spaced apart from each other so as to encompass therebetween substantially the full length of the radiating lines. As one specific example, the outermost of the radiating lines 14a, 14b are transversely spaced apart at their closest ends a distance of about nine centimeters and at their furthest apart ends a distance of about twenty-five centimeters. Also, the outermost transverse lines 16a, 16b are spaced apart a distance of about twelve centimeters.

The instrument 10 further comprises indicia means disposed on the sheet for designating the radiating lines as graduations of a scale comprising one or more minutes of sixty seconds each. More particularly, the illustrated instrument is adapted for use with maps of two different standard series, namely a 7.5-minute quadrangle map which has 2.5 minutes between the tick marks, and a 15-minute quadrangle map which has 5 minutes between the tick marks. Accordingly, the indicia means for use with the 7.5 minute quadrangle map designates the radiating lines as graduations of a scale comprising 2.5 minutes, each having sixty seconds. The indicia means for use with a 15 minute quadrangle map is illustrated in parentheses on the instrument, and designates the radiating lines as graduations of a scale comprising five minutes, each having sixty seconds. Also, the physical size of the scale as described above is designed so that the outermost radiating lines are transversely spaced apart to encompass the range of distances in which the tick marks are spaced on these two standard series of maps.

As will become apparent from the following description, it is desirable to include a sufficient number of radiating lines on the instrument to permit an accurate determination of each coordinate. Preferably, the number of radiating lines is chosen to optimize readability and accuracy, and in the illustrated embodiment, thirty-one radiating lines are employed. Thus in the illustrated embodiment, each graduation represents five seconds on the 2.5 minute scale, and ten seconds on the 5 minute scale.

FIG. 2 illustrates the method for accurately determining the geographic coordinates of a location A on a map 20 in accordance with the present invention. Initially, the location A is projected to the border of the map along a line 21 which is parallel to the lines of latitude. The instrument 10 is then placed over the map, and aligned with respect to the border such that the outermost of the radiating lines 14a, 14b directly overlie respective ones of the tick marks 22, 23 between which the projected location falls. Also, the map border is aligned in parallel with the closest transverse line 16 so that the border of the map extends perpendicularly to the medial radiating line 14c. The appropriate scale on the instrument is then read above the point at which the projected location intersects the border of the map, i.e., the point 25. The reading is then added to the coordinate value of the nearest southerly tick mark in the case of latitude or to the nearest easterly tick mark in the case of longitude. The longitude of the location A is determined by projecting the location A to the adjacent border along the line 26 which is parallel to the lines of longitude, and repeating the above steps.

In the drawings and specification, there has been set forth a preferred embodiment of the invention and although specific terms are employed, they are used in a generic and descriptive sense only and not for purposes of limitation.

That which is claimed is:

1. A method for accurately determining a geographic coordinate of a location on a map having tick marks spaced along its borders which represent specific designated coordinates, said method comprising the steps of
   projecting the location in question toward the border of the map along a direction parallel to one set of the coordinates,
   placing a transparent sheet over the map, with the sheet having a variable length scale disposed thereon which is defined by a plurality of straight lines radiating from a common point,
   aligning the scale with respect to the border of the map such that the outermost of the radiating lines are aligned with respective ones of the tick marks between which the projected location falls and with the border of the map extending perpendicularly to a line extending medially between such outermost radiating lines, and
   reading the scale above the point at which the projected location intersects the aligned scale.

2. A method for accurately determining a geographic coordinate of a location on a map having tic marks spaced along its borders which represent specific designated coordinates, said method comprising the steps of
   projecting the location in question toward the border of the map along a direction parallel to one set of the coordinates,
   placing a transparent sheet over the map, with the sheet having thereon a plurality of straight lines radiating from a common point and being spaced apart equal angular increments and a plurality of straight, parallel lines extending in a direction transverse to the radiating lines and perpendicular to a line extending medially between the outermost of the radiating lines and indicia for designating the radiating lines as graduations of a scale comprising one or more minutes of 60 seconds each,
   aligning one of the straight, parallel lines with respect to the border of the map in such a position that the outermost of the radiating lines are aligned with respective ones of the tic marks between which the projected location falls and
   reading the indicia adjacent the point at which the projected location intersects the aligned scale and thereby accurately determining the spacing of the location on the map with respect to the specific designated coordinates of the tic marks.

3. A method for accurately determining the geographic latitude and longitude of a location on a map having tic marks spaced along its borders which represent specific designated latitude and longitude coordinates, said method comprising the steps of
   projecting the location in question toward one border of the map along a direction parallel to one set of the coordinates,
   placing a transparent sheet over the map, with the sheet having a variable length scale disposed thereon which is defined by a plurality of straight lines radiating from a common point,
   aligning the scale with respect to the one border of the map such that the outermost of the radiating lines are aligned with respective ones of the tic marks between which the projected location falls and with the one border of the map extending perpendicularly to a line extending medially between such outermost radiating lines, reading the scale above the point at which the projected location intersects the aligned scale and thereby determining one of the geographic latitude and longitude coordinates of the location, then projecting the location in question toward the other border of the map along a direction parallel to the other set of the coordinates placing the transparent sheet over the map and aligning the scale with respect to the other border of the map such that the outermost of the radiating lines are aligned with respective ones of the tic marks between which the projected location falls and with the other border of the map extending perpendicularly to a line extending medially between such outermost radiating lines, and reading the scale above the point at which the projected location intersects the aligned scale so as to determine the other of the geographic latitude and longitude coordinates of the location.

* * * * *